United States Patent [19]
Schmidt

[11] 4,103,549
[45] Aug. 1, 1978

[54] TIRE VALVE CAP WITH PRESSURE INDICATOR

[76] Inventor: Helmut Schmidt, Keplerstrasse 51, 7530 Pforzheim, Fed. Rep. of Germany

[21] Appl. No.: 808,180

[22] Filed: Jun. 20, 1977

[30] Foreign Application Priority Data

Jun. 18, 1976 [DE] Fed. Rep. of Germany ....... 2627529

[51] Int. Cl.² ............................................. B60C 23/04
[52] U.S. Cl. .................................................. 73/146.8
[58] Field of Search ................... 73/146.8, 146.3, 419, 73/406

[56] References Cited
U.S. PATENT DOCUMENTS

| | | | |
|---|---|---|---|
| 1,291,901 | 1/1919 | Hurd | 73/146.8 |
| 1,397,728 | 11/1921 | Evans | 73/419 |
| 3,177,724 | 4/1965 | Trinca | 73/146.8 |
| 3,283,584 | 11/1966 | Coffing | 73/419 |
| 3,523,451 | 8/1970 | Kohn | 73/146.8 |

Primary Examiner—Donald O. Woodiel
Attorney, Agent, or Firm—Joseph A. Geiger

[57] ABSTRACT

A tire valve cap with a built-in pressure indicator consisting of a housing structure with a spring-loaded diaphragm piston exposed to the tire pressure, the axial movements of the hub of the diaphragm piston being converted into angular movements of a pointer shaft and pointer member through a helical cam connection. The position of the fixed pointer is adjustable, and the pointers are radial protrusions whose position can be ascertained visually or by finger touch.

10 Claims, 4 Drawing Figures

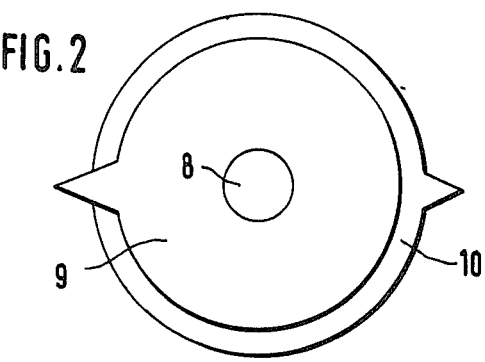
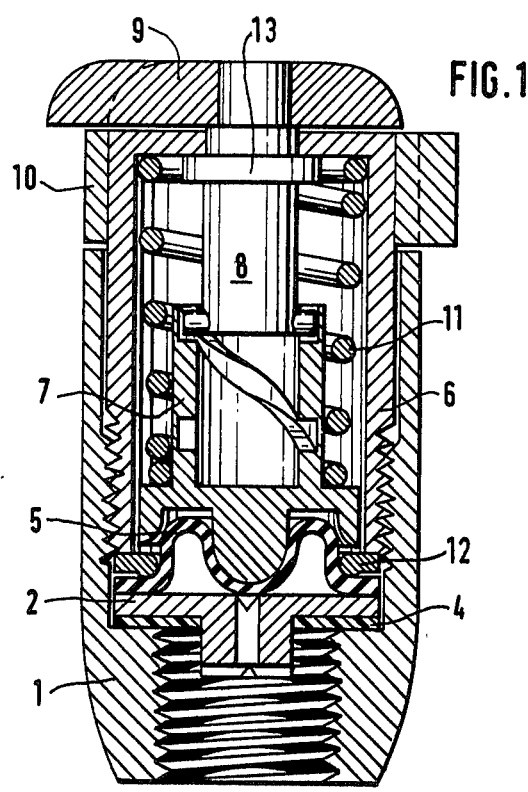

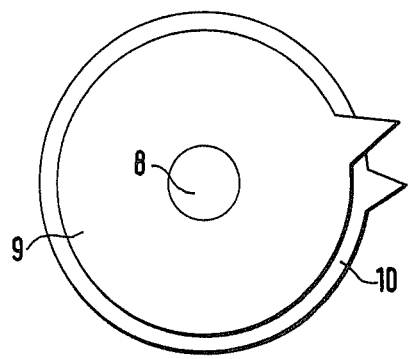
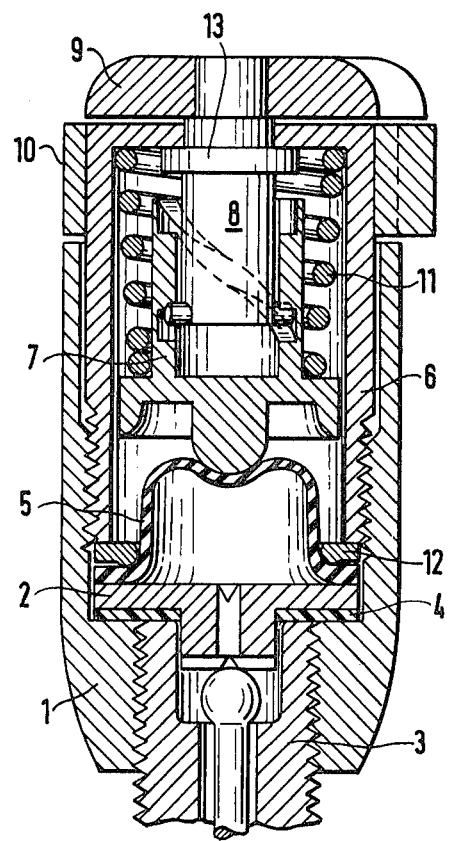

TIRE VALVE CAP WITH PRESSURE INDICATOR

BACKGROUND OF THE INVENTION

1. Field of the Invention

The present invention relates to pressure indicating devices, and, more particularly, to a tire pressure indicator which is arranged to remain mounted on the tire by serving as a tire valve cap.

2. Description of the Prior Art

The maintenance of the prescribed tire pressure of an automobile is important, both from a standpoint of traffic safety and from a standpoint of tread wear minimization. It has therefore already been suggested that each tire be provided with a pressure indicating device which can remain attached to the tire valve and which shows, upon simple inspection by the driver, whether or not the tire pressure is still adequate.

The devices which have been suggested for this purpose in the past rely, without exception, on visual inspection as a means to ascertain the pressure condition. However, such visual inspection becomes difficult or impossible, if road dirt has collected on the device, or if the particular wheel happens to be in a position in which the valve is oriented upside down. Most prior art devices have the additional disadvantage that they are comparatively large and heavy, thereby distorting the wheel balance and increasing the risk of damage to the device by a high curb.

A small, lightweight prior art valve cap with a pressure indicator is disclosed in German Gebrauchsmuster (Utility Model) No. 75 34 979. It has a diaphragm-type spring-loaded piston arranged inside a closed housing, the piston being connected to an indicator pin which protrudes axially from one end of the housing. The axial position of the indicator pin is indicative of the tire pressure. This indicator device is designed to provide a tactile as well as a visual reading, having a threaded sleeve which, at the proper tire pressure, can be adjusted to be flush with the indicator pin. A pressure deficit and a corresponding retraction of the pin can be determined by feeling the indicator with a finger, the inability of touching a small prong on the indicator pin meaning that the tire pressure has dropped below the recommended pressure range. This prior art device has the disadvantage of a comparatively short displacement stroke of the indicator pin, meaning that its reading is not very sensitive, so that the tire pressure may drop below the recommended pressure range, without being readily noticed.

SUMMARY OF THE INVENTION

Underlying the present invention is the primary objective of devising an improved tire valve cap with a built-in pressure indicator which has the advantages of compactness and light weight, and which gives a much more sensitive pressure reading that can readily be determined by sight or by touch.

The present invention proposes to attain this objective by suggesting a pressure indicator which has a closed housing and a diaphragm-type spring-loaded piston arranged for axial movement inside the housing, a rotatable pointer shaft protruding from the upper end of the housing. The axial displacements of the diaphragm piston are converted into rotary displacements of the pointer shaft by means of a helical cam arrangement, a pointer member attached to the protruding extremity of the pointer shaft indicating proper pressure through alignment with a fixed mark and a pressure deficit by rotation away from the mark.

In a preferred embodiment of the invention, the diaphragm-type piston includes a hub with a bore into which one extremity of the pointer shaft is engaged, the hub having two helical grooves which are engaged by the radially protruding extremities of a pin which is seated in the pointer shaft.

The preferred embodiment of the invention further suggests that the pressure indicator be provided with a position adjustment of either the fixed mark or the pointer member, so that the latter can be moved into alignment at the correct tire pressure. This will make it easy to determine whether or not a lower tire pressure is still within the acceptable range, or whether the tire must be reinflated. The extremity of the pointer member and the fixed mark are preferably radially pointing protrusions, for tactile determination of their positions.

BRIEF DESCRIPTION OF THE DRAWINGS

Further special features and advantages of the invention will become apparent from the description following below, when taken together with the accompanying drawings which illustrate, by way of example, a preferred embodiment of the invention, represented in the various figures as follows:

FIG. 1 shows, in a longitudinal cross section, a tire valve cap with a pressure indicator embodying the present invention, the indicator mechanism being shown in the pressureless state;

FIG. 2 is a plan view of the device of FIG. 1;

FIG. 3 shows the device of FIG. 1 in operative condition, when mounted on the valve stem of an inflated tire; and FIG. 4 is a plan view of the device of FIG. 3, reflecting a small pressure deficit.

DESCRIPTION OF THE PREFERRED EMBODIMENT

Referring to FIGS. 1–4 of the drawing, there can be seen a tire valve cap with a built-in pressure indicator, consisting essentially of a threaded socket 1 and a threaded cylinder sleeve 6 which, when screwed together, form a housing enclosure for the pressure indicating mechanism of the invention. The tubular threaded socket 1 has a neck portion with a bore of smaller diameter in its lower extremity, a female thread in this smaller-diameter bore matching the standardized male thread of a tire valve stem. The upper end portion of such a tire valve stem is shown at 3 in FIG. 3.

At the transition from the neck portion to the larger diameter of the tubular threaded socket 1 is arranged a planar seat for a bottom plate 2 and an intermediate gasket 4. The bottom plate 2 has a downwardly extending hollow protrusion with which it bears against the valve pin, when the tire valve cap is in place on the tire valve stem (FIG. 3). The gasket 4 prevents the pressurized air from leaking to the outside.

Inside the housing structure, behind the bottom plate 2, is further arranged a flexible diaphragm 5, the periphery of which is clamped against the bottom plate 2 by means of the threaded cylinder sleeve 6 and an intermediate holddown ring 12. A piston member in the form of a hub 7 engages the diaphragm 5 from behind, being arranged to move axially inside the cylinder sleeve 6, in opposition to a compression spring 11, the ends of which bear against a shoulder of the hub 7 and against an outside transverse wall of the cylinder sleeve 6.

Also arranged inside the housing structure is a pointer shaft 8, one end portion of which is rotatably journalled in the transverse wall of the cylinder sleeve 6, while the other end portion is received inside an axial bore of the hub 7. The journalled shaft portion of the pointer shaft 8 protrudes to the outside of the housing structure, where it carries a pointer member 9. The latter and a shaft collar 13 also serve to axially position the pointer shaft 8 by engaging the transverse wall of the cylinder sleeve 6 from opposite sides. On its uppermost portion, the cylinder sleeve 6 also carries a marker ring 10 which is forcibly rotatable relative to the cylinder sleeve 6, frictionally engaging the outer diameter of the sleeve 6 with a resilient clamping engagement.

Referring in particular to FIG. 3 of the drawing, the device of the invention operates as follows:

Because the tire valve is held open by the protrusion of the bottom plate 2, the underside of the diaphragm 5 is at all times exposed to the tire pressure. This pressure, tending to expand the diaphragm 5 in the axial direction, is opposed by the compression spring 11 which urges the hub 7 against the diaphragm 5. Accordingly, the axial position of the hub 7 at which equilibrium exists is an indication of the tire pressure, and this position changes, as the tire pressure changes.

The axial movements of the hub 7 are converted into equivalent rotary movements of the pointer shaft 8 through the action of a helical cam engagement between the hub 7 and the pointer shaft 8. For this purpose, the hub 8 has two diametrally opposite helical grooves in its bore which guide the two radial extremities of a pin which is seated in the pointer shaft, near its lower extremity. Since the pointer shaft 8 is not movable in the axial direction, an axial displacement of the hub 7 causes the shaft to execute a proportionate angular displacement. The rotary friction between the compression spring 11 and the hub 7 and the friction between the bulb-shaped lower portion of the hub 7 and the diaphragm 5 support the hub against rotation. If necessary, it is also possible to provide a keyway-type engagement between the periphery of the hub 7 and the bore of the cylinder sleeve 6.

Following inflation of a tire to its prescribed pressure, the pressure indicating tire valve cap of the invention is screwed onto the tire valve stem 3, as shown in FIG. 3. The tire pressure, acting on the diaphragm 5, displaces the hub 7 and rotates the pointer shaft 8 with its pointer member 9 to an angular position which reflects this pressure. At this point, the marker ring 10 on the cylinder sleeve is rotated until its radial protrusion is in angular alignment with the radial protrusion of the pointer member 9. Assuming now that, through an air lock, or with the passage of time, the tire pressure has dropped to a lower value. This means that the compression spring 11 has pushed the hub 7 an equivalent distance downwardly against the less pressurized diaphragm 5, and that the pointer shaft 8 and its attached pointer member 9 have executed a corresponding angular displacement. A small pressure drop displacement is shown in FIG. 4. As can be seen in this figure, the displacement of the pointer member 9 in relation to the marker ring 10 is ascertainable either visually, or it can be determined by touch with a finger, should the device be covered with road dirt.

As an alternative to the rotatable marker ring 10, the reference protrusion of the latter may be an integral part of the threaded cylinder sleeve 6, in which case it is necessary to arrange the compression spring 11 in such a way that it allows for the forcible rotation of the pointer shaft 8 and hub 7 in the direction of pointer shaft rotation under decreasing pressure, i.e. counterclockwise, in the case of the embodiment shown. The pointer member 9 and pointer shaft 8 are then simply rotated counterclockwise into alignment with the fixed mark of the cylinder sleeve 6, after the pressure indicating tire valve cap has been screwed onto the tire valve stem 3.

It should be understood, of course, that the foregoing disclosure describes only a preferred embodiment of the invention and that it is intended to cover all changes and modifications of this example of the invention which fall with the scope of the appended claims.

I claim the following:

1. A pressure indicating valve cap assembly which is adapted for attachment to a conventional automotive tire valve, the assembly comprising in combination:

an elongated closed housing structure with a female connecting thread in one end portion by which it can be threaded onto the end of a tire valve stem in the manner of a conventional tire valve cap, the housing structure having an axial bore and including means for opening the tire valve so as to connect an axial end portion of said bore with the tire pressure;

piston means arranged inside the housing structure and guided for movement along its axial bore, the piston means being exposed to the tire pressure and biased against said pressure by a spring, so that a change in tire pressure reflects itself in a corresponding axial displacement of the piston means;

rotary pointer means journalled inside the housing structure, in a generally coaxial relationship with its axial bore, the pointer means including a pointer member with a pointer protrusion which is located on the outside of the housing structure;

a stationary pointer protrusion arranged on the housing structure, in the vicinity of the path of said pointer member protrusion, so that the relative angular positions of the two pointer protrusions are ascertainable visually and by finger touch; and means for converting the axial displacements of the piston means into rotary displacements of the pointer means.

2. A tire valve cap assembly as defined in claim 1, wherein
   the housing structure includes a threaded socket and a cooperating threaded cylinder sleeve, one of the two defining said axial bore.

3. A tire valve cap assembly as defined in claim 2, wherein
   the socket of the housing structure is a generally cylindrical tubular body having a neck portion of reduced inner diameter on one axial end thereof, said reduced inner diameter being threaded with said female connecting thread;
   the socket forms a seat at the transition between its neck portion and the portion of larger inner diameter;
   the tire valve opening means includes a bottom plate which is sealingly engaged against said seat, the bottom plate including a hollow protrusion which, in the mounted position of the cap assembly, opens the tire valve for communication with the inside of the socket by depressing the valve pin of the tire valve.

4. A tire valve cap assembly as defined in claim 3, wherein the threaded socket has a second female thread in its portion of larger inner diameter;

the threaded cylinder sleeve reaches into said portion of larger diameter, engaging its thread with a matching male thread;

the bottom plate of the tire valve opening means is clamped against its seat by an extremity of the threaded cylinder sleeve.

5. A tire valve cap assembly as defined in claim 1, wherein the piston means is a diaphragm piston, including a diaphragm which separates the inside of the housing structure into a pressurized portion in communication with the tire pressure and a non-pressurized portion, and further including a hub which is guided for axial movement inside the axial bore of the housing structure, the hub being engaged on its axially opposite sides by the diaphragm and by said spring, respectively.

6. A tire valve cap assembly as defined in claim 5, wherein the housing structure includes a generally tubular socket with a female thread and a hollow cylinder sleeve with a matching male thread screwed into the former; and the periphery of the diaphragm is axially clamped between a shoulder portion of the socket and an extremity of the cylinder sleeve.

7. A tire valve cap assembly as defined in claim 5, wherein the housing structure includes a transverse outside wall axially opposite the end portion with the female connecting thread;

the rotary pointer means further includes a pointer shaft extending concentrically with the axial bore of the housing structure, the pointer shaft being journalled in said transverse wall and having a length portion which extends to the outside of said wall and carries said pointer member; and the axial displacement converting means is defined by the pointer shaft, in cooperation with the hub of the piston means, in the form of a helical cam on one of them and a cam follower on the other.

8. A tire valve cap assembly as defined in claim 7, wherein the hub of the piston means includes a bore which is open in the axial direction of the pointer shaft; and the pointer shaft has an end portion engaging said bore of the hub.

9. A tire valve cap assembly as defined in claim 8, wherein the helical cam of the axial displacement converting means is provided in the form of at least one helical groove in the hub; and the cooperating cam follower of said means is provided in the form of an equal number of radial pins in the engaged portion of the pointer shaft.

10. A tire valve cap assembly as defined in claim 1, wherein the housing structure further includes a frictionally mounted marker ring carrying said stationary pointer protrusion on its periphery; and the angular position of the marker ring relative to the housing structure is adjustable.

* * * * *